US006603579B1

(12) United States Patent
Kuwahara (10) Patent No.: US 6,603,579 B1
(45) Date of Patent: Aug. 5, 2003

(54) FACSIMILE APPARATUS

(75) Inventor: Tetsuya Kuwahara, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/439,781

(22) Filed: Nov. 12, 1999

(30) Foreign Application Priority Data

Nov. 13, 1998 (JP) ............................................ 10-323887

(51) Int. Cl.[7] .............................. H04N 1/32; H04N 1/00
(52) U.S. Cl. ........................................ 358/468; 358/404
(58) Field of Search ................................. 358/400, 401, 358/404, 444, 468, 442

(56) References Cited

U.S. PATENT DOCUMENTS

| 5,239,387 A | * | 8/1993 | Stein | 358/444 |
| 5,808,995 A | * | 9/1998 | Nakamura | 369/60 |
| 5,896,203 A | * | 4/1999 | Shibata | 358/404 |
| 6,262,816 B1 | * | 7/2001 | Rindsig | 358/498 |

FOREIGN PATENT DOCUMENTS

| EP | 507439 A2 | * 10/1992 | ............ G06F/3/00 |
| JP | 4-6944 | 1/1992 | ............ H04N/1/21 |
| JP | 4-177968 | 6/1992 | ............ H04N/1/32 |

* cited by examiner

Primary Examiner—Jerome Grant, II
(74) Attorney, Agent, or Firm—Hogan & Hartson, LLP

(57) ABSTRACT

Image data from a document being scanned is encoded and stored in an image memory (4). As soon as the amount of data in the image memory (4) reaches a pre-set limit, the machine (F) begins transmission of the data to a designated recipient from the image memory (4). If it is determined that there is insufficient memory to store image data of a document being scanned in the image memory (4), the machine suspends scanning of the document, and transmits all the encoded data to the recipient from the image memory (4). Then, the machine (F) resumes the scanning and encoding operations. When it resumes scanning the remaining pages of the document and encoding the resultant image data, it transmits that data directly to the remote party without first storing that data into the image memory (4).

14 Claims, 6 Drawing Sheets

FACSIMILE APPARATUS

CROSS-REFERENCE TO RELATED APPLICATIONS

The present application claims priority under 35 U.S.C. 119 of Japanese Patent Application No. 10-323887, filed on Nov. 13, 1998, the disclosure of which is expressly incorporated by reference herein in its entirety.

BACKGROUND OF THE INVENTION

1. Field of the Invention

The present invention relates in general to a facsimile machine that stores the image data of a scanned document in an image memory and then transmits that data to a remote party, and relates in particular to a facsimile machine that does not terminate storage of scanned document data even when, in the middle of scanning and storing image data in the image memory, the image memory becomes full, and further relates to a facsimile machine that is capable of reducing the amount of overall processing time needed from the start of scanning to the completion of data transmission.

2. Description of the Related Art

Today facsimile machines are often able to scan an entire document, encode the resulting image data, and temporarily store that data in an image memory before transmitting the image data to a remote machine (referred to as "via-memory transmission" or simply "memory transmission" hereinbelow) if they are used as a data transmitting device, and also able to save the image data for an entire document received from a remote party in the image memory before decoding the data and printing it out onto a recording sheet if used as a data receiving device. These facsimile machines can further be used as a photocopier which scans an entire document, encode the resulting image data, and temporarily store that data in an image memory before printing it out.

When such facsimile machines scan a document and store the image data of the document in an image memory, they generally scan the document "sequentially", one line at a time, convert the one line of scanned image to binary data, temporarily store the data in a buffer memory, encode the data and then store it in the image memory. They then repeat a series of these processes for the subsequent lines of the document page. Consequently, such a facsimile machine is unable to encode binary data for the next line of a document until the coding operation for the previous line of the document is completed. When the image being scanned in this manner is a data-intensive image such as a picture, scanning one page of a document may require a great deal of time.

In an attempt to solve this problem, facsimile machines have been provided with page buffers—either comprising part of the image memory or as an independent element—for storing one document page worth of image data in binary form. The one page of image data stored in the page buffer is then sequentially coded and stored in the image memory, thus speeding up the per-page encoding and per-page scanning speeds.

Capacity of the image memory and memory space is limited, however, and particularly when such facsimile machines load into this limited memory the image data of another document to be transmitted or copied, or when data is received from a remote party and stored in the memory and the printing is being executed, the memory may then become full in the middle of the new scanning operation, thus resulting in the termination of scanning, the need to rescan the document, increased total transmission time, and increased frustration for the operator.

SUMMARY OF THE INVENTION

It is thus an object of the present invention to provide a facsimile machine which does not terminate the data storage operation even when the image memory becomes full during the loading of image data into the image memory, and which is also capable of reducing the amount of processing time, from the start of scanning to the completion of data transmission, needed to transmit a document.

In order to accomplish this object, in a facsimile machine according to a first aspect of the present invention, as soon as the amount of data stored in the image memory reaches a predetermined level during the encoding and storing of image data for a document being sequentially scanned, transmission of the encoded image data to a designated recipient from the image memory is immediately initiated. If the vacant space available in the image memory for storing the image data of a document being scanned becomes insufficient (i.e., the image memory becomes full), scanning of the document is suspended, transmission of all the encoded image data that is stored in the image memory is initiated, and after completion of this transmission, scanning and encoding of the document is resumed. In this case, the encoded data is transmitted directly to the recipient without being stored in the image memory.

Thus, when the predetermined data level is set at one document page of image data, for example, the remote facsimile machine is dialed immediately upon reaching the one page level of data in the image memory, and transmission of the coded image data stored in the image memory is initiated.

Furthermore, if, for example, space in the image memory is taken up by image data received from a remote source, and space in the image memory becomes insufficient for storing additional image data during scanning of a document for transmission, the scanning of the document is suspended, and all of the encoded image data for transmission that is stored in the image memory is immediately transmitted to the remote party, after completion of which sequential scanning is resumed; and the document is transmitted as it is encoded. Thus, the scanning operation is not terminated in the middle of scanning a document even when the image memory becomes full, unlike the case of prior art machines. Consequently, the document need only be loaded once into the machine (or reloading of the document is never required after completion of the scanning), thus reducing time and hassle, particularly when sending data-intensive documents.

When the facsimile machine receives from the recipient (e.g., a remote facsimile) data indicating the encoding capability of the recipient after it initiates transmission of the image data from the image memory to the remote facsimile, it preferably changes the encoding scheme for the data to be transmitted that is stored in the image memory to an encoding scheme of within the capabilities of the remote facsimile. The facsimile machine of the present invention may be capable of employing MH, MR, MMR, JBIG and other encoding schemes. When the facsimile machine dials a remote party and receives a transmission procedure signal from the remote party, which carries data indicating the encoding scheme of the remote party, the facsimile machine may select an encoding scheme to match the encoding scheme indicated by that data. Therefore, the encoding method for the image data stored in the image memory can be changed according to the encoding method of the remote party. In particular, the encoding method employed by the facsimile machine of the invention can be set to the most efficient common coding method with the highest compression rate shared by the two parties, thus enabling even faster transmission of facsimile data.

According to a second aspect of the facsimile machine of the present invention, image data from a document being scanned is temporarily stored in a page buffer, encoded, and then stored in an image memory. As soon as the amount of data stored in the image memory reaches a predetermined level, transmission of the encoded image data to a designated recipient from the image memory is immediately initiated. If the space available in the image memory for storing the encoded data becomes insufficient, scanning of the document is suspended, and all the encoded image data that has been stored in the image memory is transmitted to the recipient. After that, the image data stored in the page buffer data is encoded and transmitted to the recipient. Then, scanning of the document is resumed, and the resultant image data is encoded and transmitted directly to the recipient without first being stored in the page buffer or image memory.

Thus, when the predetermined data level is set at one document page of image data, for example, as soon as the one page of data for transmission has been loaded into the image memory, the remote party is dialed and the data in the image memory is transmitted. Furthermore, if, for example, space in the image memory is taken up by image data received from a remote source, and space in the image memory becomes insufficient for storing additional image data during scanning of a document for transmission, the facsimile machine suspends scanning of the document and immediately transmits all of the encoded image data for transmission that is stored in the image memory, and then encodes and transmits the image data stored in the page buffer. The facsimile machine then resumes scanning the document, encodes the image data and transmits the encoded data to the recipient.

Thus, in addition to the benefits of the first aspect, the image data stored in the page buffer in the form of binary data is not lost, and can be used in an effective manner to help expedite the data transmission.

It should be noted that the exact figures of one page for the predetermined memory level is used for exemplary purposes only, and could be set to an arbitrary proportion of total image memory, such as preferably 10%, 20%, etc.

Various other objects, features, and many of the attendant advantages of the invention will be readily appreciated as the same become better understood by reference to the following detailed description of the non-limiting examples of the preferred embodiments when considered with the accompanying drawings.

DETAILED DESCRIPTION OF THE INVENTION

The facsimile machine of the present invention will now be described with reference to the accompanying drawings.

Structure of the Facsimile Machine

Figure 1:
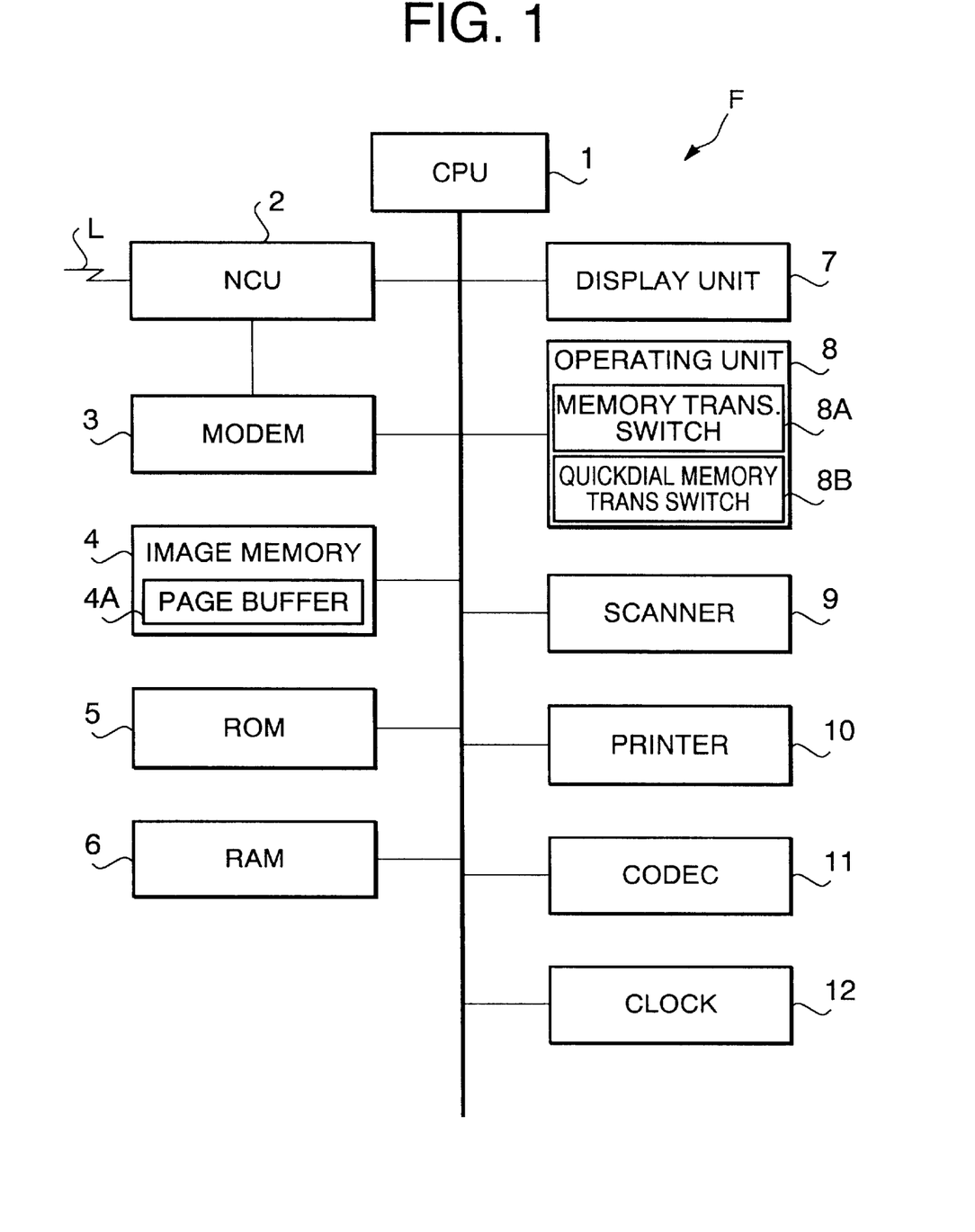
FIG. 1 illustrates the outline structure of the main internal components of a facsimile machine according to the present invention.

Referring to FIG. 1, illustrated is a facsimile machine F including a control unit 1 such as a CPU or the like for transmitting data to a remote party. The facsimile machine F also includes a Network Control Unit (NCU) 2 which controls connection and disconnection and transmission of dialing signals (address signals) to a telephone line L, a modem 3 which modulates and demodulates signals for the transmission and reception of facsimile data, and an image memory 4 which stores encoded image data, the image memory 4 also having a page buffer 4A. The facsimile machine F further includes a ROM 5 which stores various programs needed to operate the facsimile machine F, a RAM 6 which stores speed-dial numbers and the like, a display unit 7 such as an LCD, LED indicators, or the like, an operating unit 8 containing various keys used to operate the machine, the operating unit 8 having a memory transmission setting switch 8A and a quick dial memory transmission switch 8B, a scanner 9 which scans-in image data from a document loaded into the machine F, a printer 10 which prints out image data onto recording paper that has been loaded into the machine F, a CODEC unit 11 which codes and decodes image data, and a clock device 12 which calculates the current time.

In the present embodiment, blocks of the image memory 4 are allocated for use as the page buffer 4A, but it should be noted that the page. buffer 4A may be an independent element.

Additionally, the various encoding schemes (such as MH, MR, MMR, JBIG, and the like) of the CODEC unit 11 may be made selectable via control of the CPU 1.

General Operation of the Machine

Figure 2:
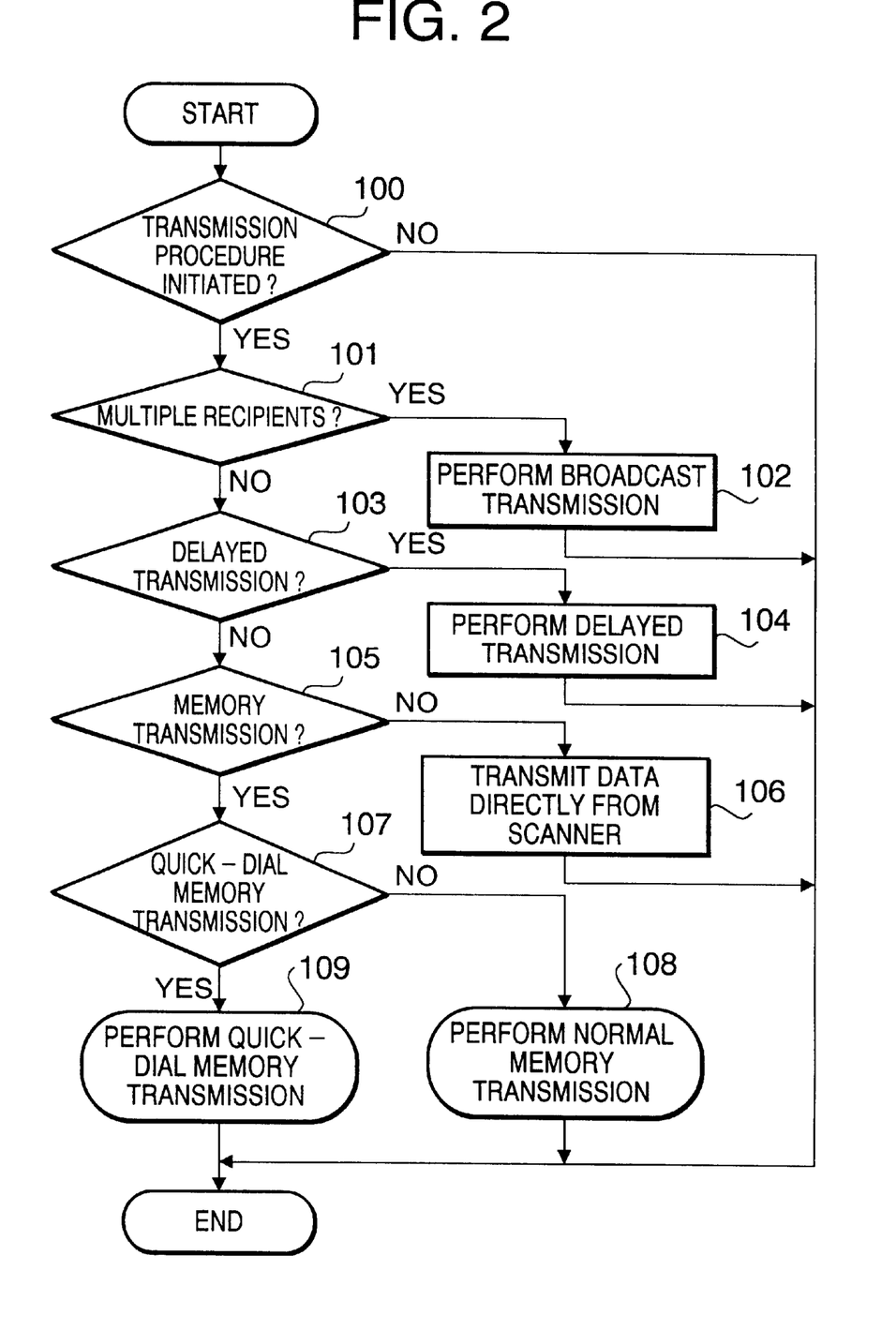
FIG. 2 is a flow chart showing one example of a general operating procedure of the facsimile machine shown in FIG. 1.

Operation of the facsimile machine F of the present invention will now be described using the flow chart of FIG. 2 (steps S100–S109).

First, when a user performs a predetermined operation to initiate a transmission procedure (step S100), the CPU 1 determines whether the transmission will be sent to only one or to a plurality of recipients (step S101). If the transmission will be sent to a plurality of recipients, then the machine F begins a broadcast transmission procedure (step S102).

In the broadcast transmission procedure, the CPU 1 transmits encoded image data stored in the image memory 4 to the plurality of pre-set recipients.

If, however, multiple recipients are not specified at step S101, it is determined whether or not delayed transmission has been selected (step S103). If so, the facsimile machine F executes a delayed transmission procedure (step S104).

In the delayed transmission procedure, when the clock 12 reaches the time designated for transmission, the CPU 1 transmits the encoded image data from the image memory 4. The transmission time has been specified by an operator via the operation executed at step 5100.

If, however, it is determined at step 5103 that delayed transmission is not selected, the CPU 1 then determines whether or not "via-memory transmission" has been selected (step S105). This selection is made by the memory transmission switch 8A.

If the "via-memory transmission" has not been selected, the CPU 1 begins transmission directly from the scanner (i.e. without first storing the scanned data in the memory) (step S106). This data transmission is referred to as "scanner transmission" hereinafter.

When performing such scanner transmission, the CPU 1 scans-in a document loaded into the scanner 9, converts it into binary data, encodes the data using CODEC 11, and then transmits the encoded data to a designated recipient.

If, however, it is determined at step S105 that the via-memory transmission has been selected, then at step S107 the machine F determines whether or not the user has selected quick-dial memory transmission by activating the quick dial memory transmission switch 8B.

If the quick-dial memory transmission has been selected, then at step S109 the CPU 1 executes the quick-dial memory transmission procedure described below.

If the quick-dial memory transmission has not been selected, however, then at step S108 the facsimile machine F executes a normal via-memory transmission procedure.

During the normal via-memory transmission, the CPU 1 scans-in a document loaded in the scanner 9, encodes the image data of the document line by line (or page by page) and stores it in the image memory 4. After this is completed, it then sends the converted data to a remote location via the modem 3 and NCU 2 from the image memory 4.

Quick Dial Memory Transmission

The quick dial memory transmission operation will now be described with reference to FIGS. 3 to 6.

Figure 3:
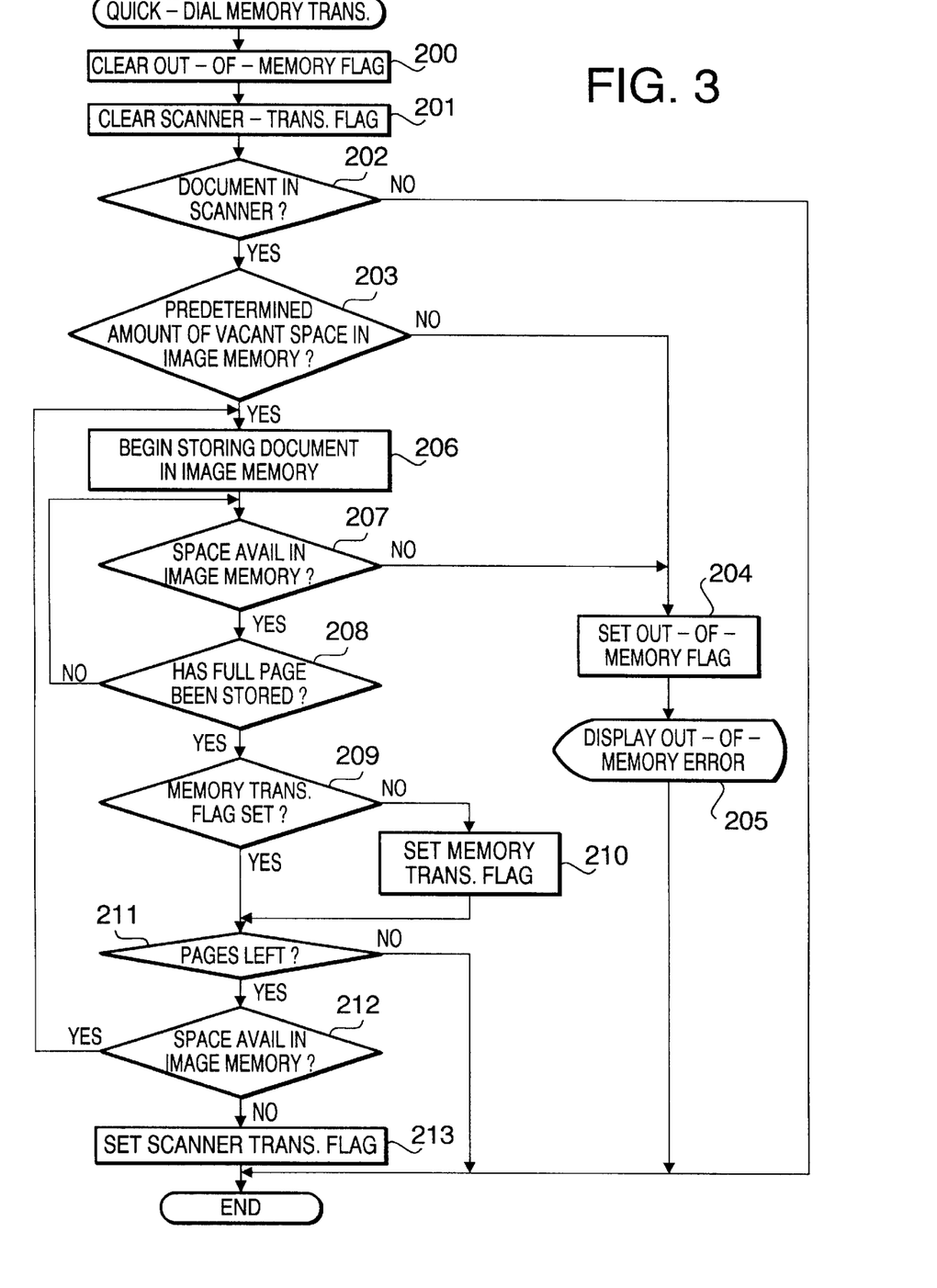
FIG. 3 is a flow chart showing one embodiment of a quick dial memory transmission procedure of the facsimile machine shown in FIG. 1.

FIG. 3 is a flow chart showing an example of the processing steps (S200–S213) performed to execute the quick dial memory transmission operation.

During this operation, image data from a document scanned in by the scanner 9 is sequentially encoded, and then stored in the image memory 4 without being stored in the page buffer 4A.

First, CPU 1 clears the out-of-memory flag (step S200) and the scanner transmission flag (step S201).

Next, the CPU determines whether or not there is a document loaded at the scanner 9 (step S202), and if so (step S202, YES), then determines whether or not there is at least a predetermined amount of memory area available in the image memory 4 (step S203).

If less than the predetermined amount of vacant area is available in the image memory 4 (step S203, No), then the CPU 1 sets the out-of-memory flag (step S204), and displays an appropriate message in the display unit 7, such as "Out of Memory" (step S205).

If, however, at least the predetermined amount of memory is available in the image memory 4 (step S203, YES), then the CPU 1 begins storing the document data; the machine scans the document one page at a time, encodes the image data and stores it in the image memory 4 (step S206).

Next, CPU 1 again determines whether or not space is available in the image memory 4 (step S207), and if memory is still available (step S207, YES), it continues storing the image data. If, however, memory is no longer available, the CPU 1 sets the out-of-memory flag (step S204), and displays the "out-of-memory" message (step S205).

If the answer at step S207 is YES, it is then determined whether or not one full-page worth of image data has been stored in the image memory 4 (step S208). If so (step S208, YES), it is then determined whether or not the memory transmission flag has been set (step S209).

Figure 4:
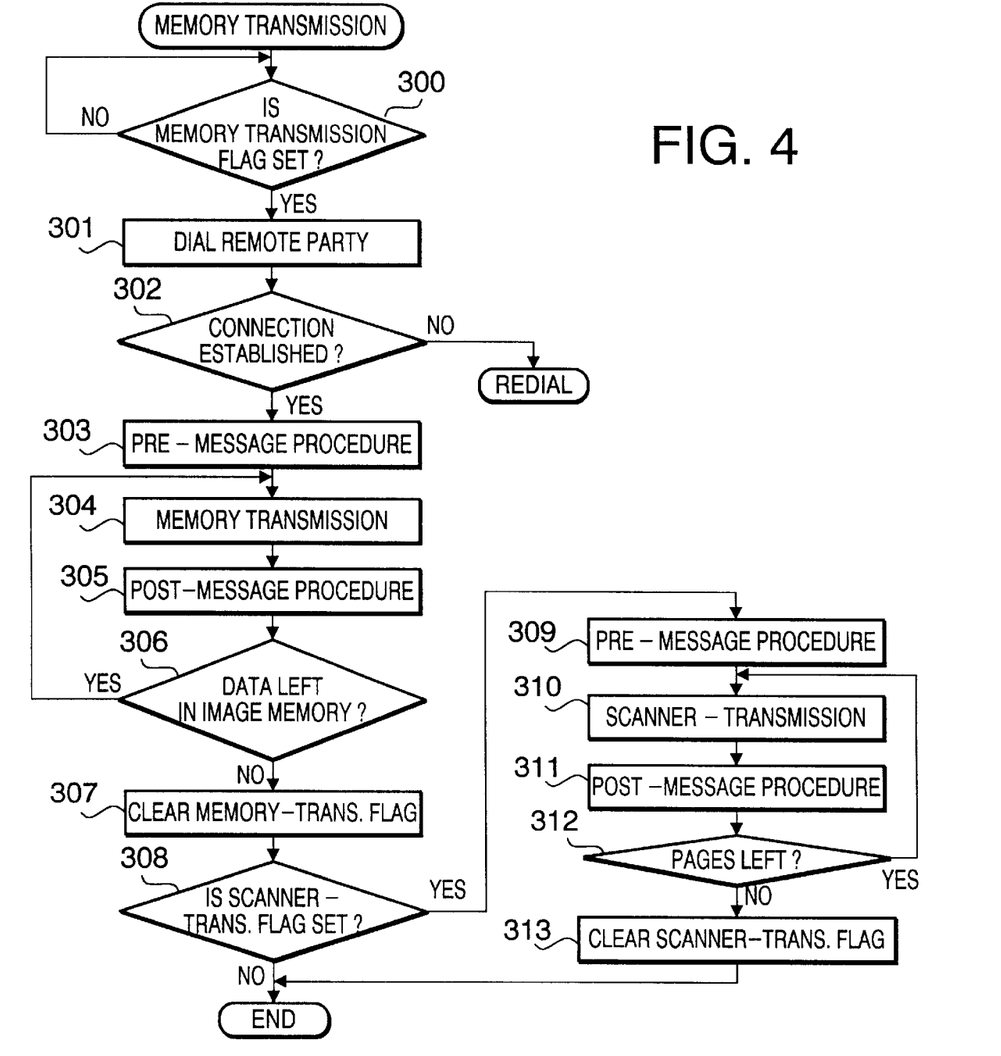
FIG. 4 is a flow chart showing one embodiment of a memory transmission procedure of the facsimile machine shown in FIG. 1.

If the memory transmission flag has been set (step S209, YES), then the program proceeds directly to step S211, but if not (step S209, NO), then the CPU 1 sets the flag and begins transmitting the encoded image data stored in the image memory (step S210) (See FIG. 4).

At step S211 it is determined whether or not any pages of the document remain loaded at the scanner 9, and if so (step S211, YES), the CPU once again determines if memory is available in the image memory 4 (step S212). If so, the program returns to step S206 and repeats the scanning procedure. If, however, sufficient memory is not available, the CPU 1 sets the scanner transmission flag (step S213), and ends the quick-dial memory transmission procedure. When all the pages of the document are scanned (step 5211, No), the program also ends up.

Memory Transmission

The via-memory transmission procedure will now be described with reference to the flow chart in FIG. 4.

At step S300, the CPU 1 determines whether or not the memory transmission flag has been set. If so (step S300, YES), then the CPU 1 dials the remote location (step S301). It then determines whether or not connection is established with the remote location (step S302). If the connection is not established (step S302, NO), then it performs a redialing procedure, but if connection is established (step S302, YES), it executes a predetermined facsimile pre-message procedure (step S303), and transmits the encoded image data stored in the image memory 4 (step S304). Next, it executes a predetermined facsimile post-message procedure (step S305).

Next, the CPU 1 determines whether or not untransmitted encoded image data remains stored in the image memory 4 (step S306). If so (step S306, YES), then the program returns to step S304 and repeats memory transmission, but if not (step S306, NO) then the program proceeds to step S307 where the CPU clears the memory transmission flag.

Next, at step S308, the CPU determines whether or not the scanner transmission flag has been set. If not (step 5308, NO), the program ends, but if so (step 5308, YES), then the CPU executes a predetermined facsimile pre-message procedure (step S309), and initiates scanner transmission (step S310); it sequentially scans each page of the document loaded at the scanner 9, encodes it and transmits the encoded data. It then executes a predetermined facsimile post-message procedure after transmission of each page worth of image data (step 5311).

The CPU 1 then determines whether or not there are any pages remaining to be transmitted (step S312), and if so (step S312, YES), repeats steps S310–5312. If not (step 5313, NO), then the CPU 1 clears the scanner transmission flag (step S313) and ends the memory transmission procedure.

Alternate Quick Dial Memory Transmission Procedure

Figure 5:
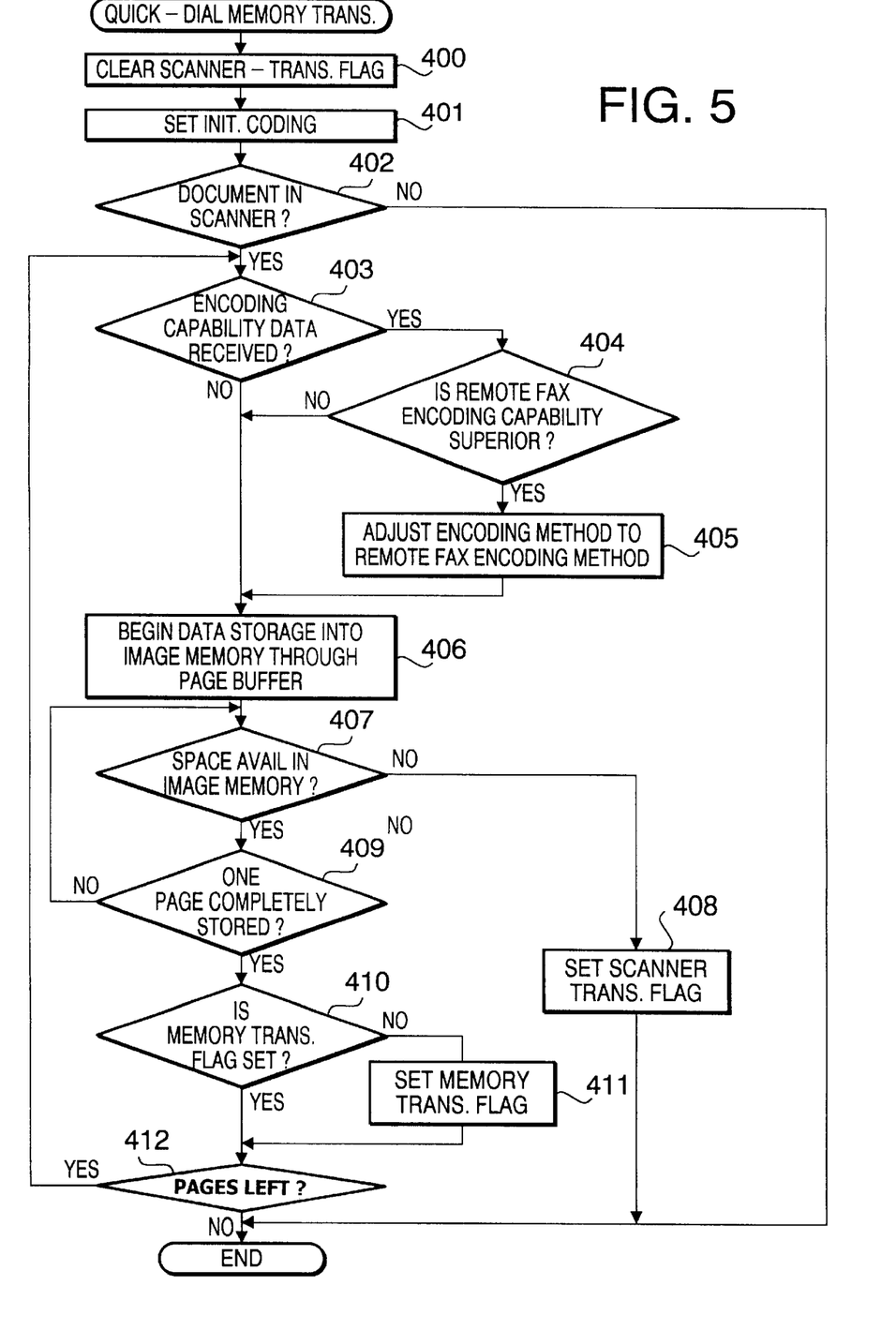
FIG. 5 is a flow chart showing an alternate embodiment of the quick dial memory transmission procedure.

An alternate embodiment of the quick dial memory transmission procedure will now be described using the flow chart of FIG. 5 (steps S400 to 5412).

In this alternative embodiment, image data from a document scanned-in by the scanner 9 is temporarily stored as binary data in the page buffer 4A, and this data is then sequentially encoded and stored in the image memory 4.

First, CPU 1 clears the scanner transmission flag (step S400).

Next, the CPU then initializes the encoding scheme of the CODEC 11, i.e., it selects a low level encoding scheme such as MR or MH encoding (step 5401).

It is then determined whether or not a document has been loaded at the scanner 9 (step S402). If not (step S402, NO), then the quick dial memory transmission procedure terminates, but if a document is loaded, the program proceeds to step S403.

At step S403 it is determined whether or not data indicating the encoding capability of the remote device has been received (step .S403). It should be noted here that the remote device encoding capability data is not received unless a memory transmission procedure described by the flow chart of FIG. 6, for example, has started. If such data has not been received (step S403, NO), then the program proceeds directly to step S406, but if it has been received (step S403, YES), then the program proceeds to step S404 where it is determined whether the remote machine has a higher encoding capability (i.e., whether the remote machine is set to a higher level of encoding scheme) than the facsimile machine F. In this particular embodiment, the facsimile machine F has been set to a relatively primitive scheme such as MR or MH at step S401. If the encoding scheme of the remote machine is superior to the facsimile machine F, the encoding scheme of the facsimile machine F is changed to the highest encoding scheme which both the remote and local machines are capable of employing (step S405).

Examples of high-level encoding schemes that are very efficient, and which might be chosen by the facsimile machine F of the present invention, include JBIG and MMR encoding. Using these encoding schemes would permit the image data to be encoded in a highly compressed form, and would reduce the amount of data that needs to be transmitted.

Thus, after temporarily storing in the page buffer 4A one page worth of image data scanned in from a document by the scanner 9, CPU 1 sequentially encodes the data from the page buffer 4 and stores it in the image memory 4 (step S406). Next, CPU 1 determines whether or not there is sufficient space available in the image memory 4 (step S407), and if not (step S407, NO), it sets the scanner transmission flag at step S408. If, however, there is sufficient space available in the image memory 4 (step S407, YES), then the CPU determines whether or not one page worth of data has been completely stored (step S409). If the page of data has not been completely stored (step S409, NO), then the program returns to step S407. If, however, one page of data has been completely stored (step S409, YES), then the CPU 1 determines the status of the memory transmission flag (step S410). If the memory transmission flag has not been set (step S410, NO), then CPU 1 sets the memory transmission flag and begins transmitting the encoded image data stored in the image memory 4 (step S411) (see FIG. 6). If YES at step S410, CPU 1 immediately starts transmission of the encoded data to a remote facsimile from the image memory 4.

Next, it is determined at step S412 whether or not there are untransmitted pages remaining at the scanner 9. If so (step S412, YES), then the program returns to step S403, thereby encoding the image data temporarily stored in the page buffer 4A, and storing it into the image memory 4 while it is determining if vacant space is available in the image memory 4. Upon storing one page worth of image data in the image memory 4, CPU 1 transmits the encoded image data to a remote facsimile. When image data for all of the pages of the document loaded at the scanner 9 have been transmitted, and there are thus no pages remaining to transmit (step S412, No), the quick dial memory transmission program is terminated.

When the image memory 4 becomes full in the middle of encoding data stored in the page buffer 4A and transferring it into the image memory 4, the CPU 1 can set the scanner-transmission flag (step S408) even if the machine F is in the middle of scanning a page of the document to be transmitted.

The CPU 1 may also direct the completion of scanning of the page currently being scanned, store that image data in the page buffer 4A, and temporarily halt the scanner 9.

Alternate Memory Transmission Procedure

Figure 6:
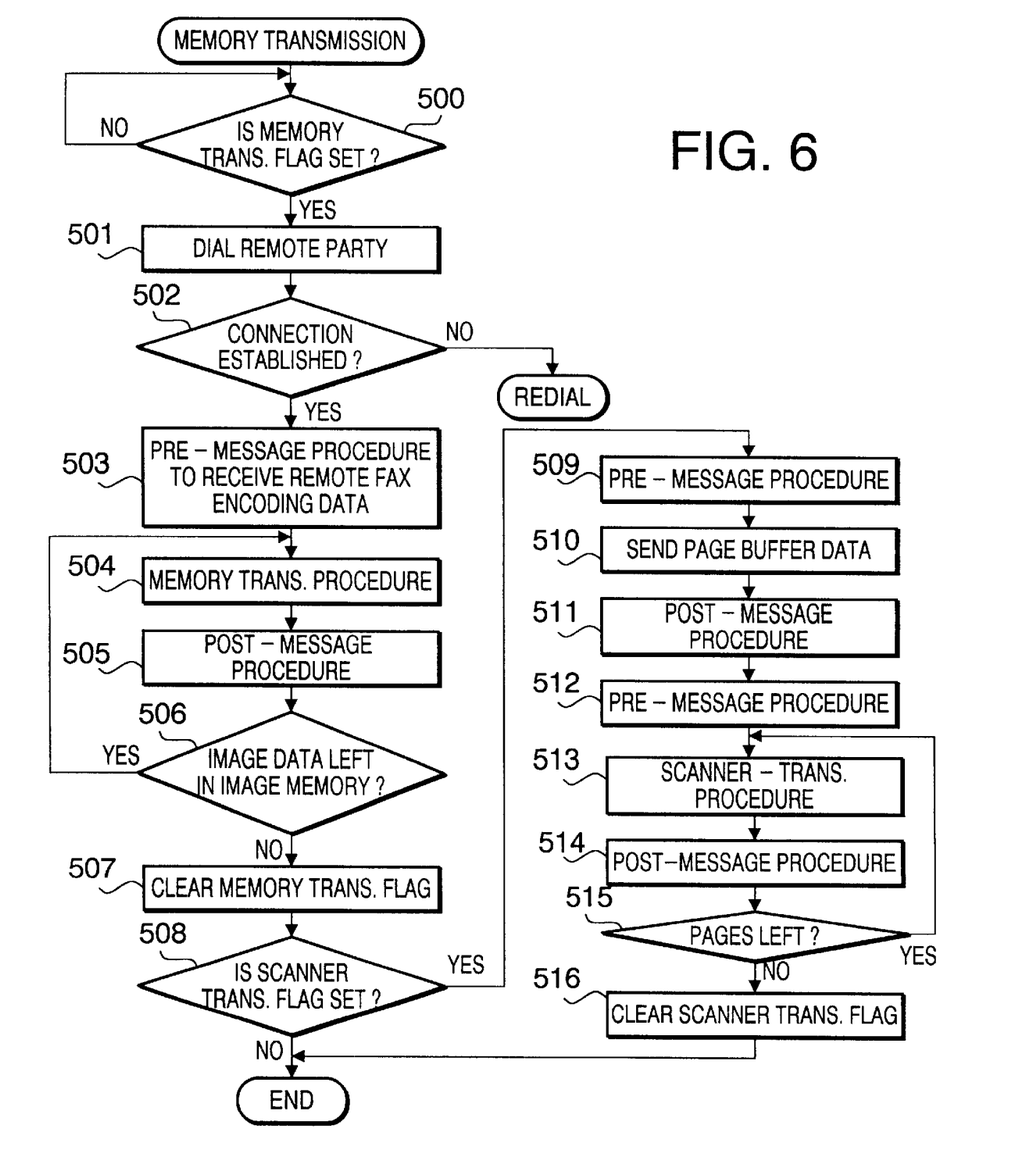
FIG. 6 is a flow chart showing an alternate embodiment of the memory transmission procedure.

An alternate embodiment of the memory transmission procedure will now be described in reference to the flow chart of FIG. 6 (steps S500 to 5514). This flow chart deals with the memory transmission described in connection with FIG. 5.

The procedure begins by the CPU 1 determining whether or not the memory transmission flag has been set (step S500). Once it is determined that the memory transmission flag has been set (step S500, YES), the CPU 1 dials the remote location (step S501), and then determines whether or not a connection is established (step 5502). If the CPU 1 does not determine that a connection is established (step S502, NO), then it initiates a redialing procedure, but if it is determined that a connection has been established (step S502, YES), then the CPU 1 performs a predetermined facsimile pre-message procedure and receives data indicating the encoding capabilities of the remote device (step S503).

Next, CPU 1 transmits the encoded image data stored in the image memory 4 (step S504), and performs a predetermined facsimile post-message procedure (step 5505). It then determines whether or not there is any untransmitted data in the image memory 4 (step S506). If there is data remaining to be transmitted (step S506, YES), then the program returns to step S504 and continues transmitting the data, but if all the data has been transmitted (step S506, NO), the program proceeds to step 5507 where the memory transmission flag is cleared.

Next it is determined whether or not the scanner transmission flag has been set (step S508). If the scanner transmission flag has been set (step S508, YES), then the CPU 1 performs a predetermined facsimile pre-message procedure (step S509), and encodes and immediately transmits the image data stored in the page buffer 4A (step S510). It then performs a predetermined facsimile post-message procedure (step S511).

At step S512, the CPU once again performs a predetermined facsimile pre-message procedure with the remote device, and then begins scanner transmission by sequentially scanning the document from the scanner 9, encodes it and transmits the resulting data to the designated recipient (step S513). The facsimile machine F performs a predetermined facsimile post-message procedure after image data for each page of the document is transmitted (step S514).

At step S515 the CPU 1 determines whether there are any untransmitted pages remaining at the scanner 9, and if so (step S515, YES), returns to step S513 to complete the scanned transmission of the document. If not (step S515, NO), then the scanner transmission flag is cleared (step S516), and the procedure is terminated.

As can be seen from the forgoing description, the facsimile machine of the present invention sequentially scans a document, and after a predetermined amount of encoded image data has been stored in the image memory 4, immediately begins transmitting the encoded image data from the image memory 4. This enables the amount of time required between the start of scanning and the completion of transmission to process the entire document to be greatly reduced.

What is claimed is:

1. A facsimile machine comprising:
   a scanner that scans a document and produces image data;
   an encoding unit that encodes said image data;
   an image memory that stores said encoded image data;
   a transmission unit that transmits said encoded image data to a recipient from the image memory or from the encoding unit; and
   a control unit that controls transmission of said data, and
   wherein when the amount of encoded image data stored in the image memory reaches a predetermined level, the control unit immediately causes the transmission unit to transmit the encoded image data to the recipient from the image memory, and
   when there is insufficient space available in the image memory, the control unit causes the scanner to suspend the scanning of the document, the transmission unit to transmit all the encoded image data stored in the image memory, and after completion of said transmission, the control unit causes the scanner to resume scanning of the remaining document, the encoding unit to encode image data of the scanned document, and the transmission unit to directly transmit the encoded image data to the recipient without storing said encoded image data in the image memory.

2. The facsimile machine of claim 1 further including a reception unit for receiving from the recipient data indicating an encoding capability of the recipient, and wherein the encoding unit is capable of employing one of a plurality of encoding schemes, and when the reception unit receives said data, the control unit sets the encoding scheme employed by the encoding unit to an encoding scheme within the encoding capabilities indicated by said data.

3. The facsimile machine of claim 2, wherein when the reception unit receives said data, the control unit sets the encoding scheme employed by the encoding unit to the most efficient encoding scheme shared by the facsimile machine and recipient.

4. A facsimile machine comprising:
   a scanner for scanning a document and producing image data;
   a page buffer for storing said image data;
   an encoding unit for encoding said image data produced by said scanner or stored in the page buffer;
   an image memory for storing said encoded image data;
   a transmission unit for transmitting said encoded image data to a remote party from said encoding unit or said image memory; and
   a control unit that is capable of directing transmission of the encoded data from the encoding unit and also capable of directing transmission of the encoded data from the image memory, and
   wherein when the amount of encoded image data stored in the image memory reaches a predetermined level, the control unit immediately causes the transmission unit to transmit the encoded image data to the remote party from the image memory, and
   when there is insufficient space available in the image memory, the control unit causes the scanner to suspend scanning of the document, the transmission unit to transmit all the encoded image data to the remote party from the image memory, and after completion of said transmission from the image memory, the control unit causes the encoding unit to encode the image data stored in the page buffer, causes the transmission unit to transmit the encoded image data to the remote party, and after completion of said transmission from the page buffer, the control unit causes the scanner to resume scanning of the remaining document, the encoding unit to encode the scanned image and the transmission unit to directly transmit the encoded data to the remote party without first storing said data in the image memory or the page buffer.

5. The facsimile machine of claim 4 further including a reception unit for receiving from the remote party capability data indicating an encoding scheme of the remote party, and wherein the encoding unit is capable of employing one of a plurality of encoding schemes, and when the reception unit receives said capability data, the control unit sets the encoding scheme employed by the encoding unit to the encoding scheme of the remote party indicated by said capability data.

6. The facsimile machine of claim 5, wherein when the reception unit receives said capability data, the control unit sets the encoding scheme employed by the encoding unit to the most efficient encoding scheme shared by the facsimile machine and said remote party.

7. The facsimile machine of claim 4, wherein the control unit determines whether or not there is sufficient space available in the image memory during the scanning of a document page.

8. The facsimile machine of claim 4, wherein when during the scanning of a document page the control unit determines that there is not sufficient space available in the image memory, the control unit causes the page buffer to store all the image data for that page, and then causes the scanner to halt the scanning of the document.

9. A method of transmitting image data to a desired remote party, comprising the steps of:
   (A) scanning a document, encoding the resultant image data, and storing said encoded image data in an image memory;
   (B) initiating transmission of said encoded image data to the remote party from said image memory when the amount of said encoded image data stored in said image memory reaches a predetermined level;
   (C) determining whether or not there is sufficient space available in said image memory;
   (D) suspending the scanning of the document when it is determined that there is insufficient space available in said image memory;
   (E) transmitting all of said encoded image data to the remote party from said image memory after Step D; and
   (F) resuming scanning and transmitting encoded image data without first storing said encoded image data in said image memory after Step E.

10. The method of transmitting image data according to claim 9 further comprising the steps of:
    (G) receiving capability data indicating the encoding scheme of the remote party after execution of Step B; and
    (H) setting an encoding scheme at Step A applied to the image data stored in said image memory based upon said capability data.

11. A method of transmitting image data to a desired remote party, comprising the steps of:

(A) initiating the scanning a document, storing the resultant image data in a page buffer, encoding said data stored in said page buffer, and storing said encoded data in an image memory;

(B) initiating transmission of said encoded image data to the remote party from said image memory when the amount of said encoded image data stored in said image memory reaches a predetermined level;

(C) determining whether or not there is sufficient space available in said image memory;

(D) suspending the scanning of the document when it is determined that there is insufficient space available in said image memory;

(E) transmitting all of said encoded image data to the remote party from said image memory after performing Step D;

(F) encoding said image data stored in said page buffer and transmitting said encoded data to the remote party after performing Step E; and (G) resuming scanning of a document, encoding the resultant image data and transmitting said encoded data to the remote party without first storing said data in said image memory or said page buffer after performing Step F.

12. The method of transmitting image data according to claim 11 further comprising the steps of:

(H) receiving capability data indicating the encoding scheme of the remote party after execution of Step B; and (I) setting the encoding scheme applied to the image data to be stored in said image memory based upon said capability data.

13. The method of transmitting image data according to claim 11, wherein at Step C, it is determined whether or not there is sufficient space available in said image memory even during the scanning of a document page.

14. The method of transmitting image data according to claim 13, wherein at Step D, scanning of a document is suspended after completion of the scanning of the document page currently being scanned, and storage of all of the image data for said page in said page buffer.

* * * * *